US008224876B1

(12) United States Patent
Henriksen

(10) Patent No.: US 8,224,876 B1
(45) Date of Patent: Jul. 17, 2012

(54) METHOD AND APPARATUS FOR CREATING AN EMBEDDED TAG FOR A COMPUTER SYSTEM

(75) Inventor: Peter Henriksen, Fresno, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1063 days.

(21) Appl. No.: 11/115,430

(22) Filed: Apr. 27, 2005

(51) Int. Cl.
*G06F 17/30* (2006.01)
(52) U.S. Cl. ...................................... 707/821
(58) Field of Classification Search ............... 707/104.1; 717/174; 711/152
See application file for complete search history.

(56) References Cited

U.S. PATENT DOCUMENTS

| | | | |
|---|---|---|---|
| 7,079,527 B2 * | 7/2006 | Owens | 370/352 |
| 7,228,299 B1 * | 6/2007 | Harmer et al. | 707/741 |
| 7,251,749 B1 * | 7/2007 | Fong et al. | 714/20 |
| 2002/0174307 A1 * | 11/2002 | Yoshida et al. | 711/152 |
| 2003/0053443 A1 * | 3/2003 | Owens | 370/352 |
| 2005/0177829 A1 * | 8/2005 | Vishwanath | 717/177 |
| 2005/0198629 A1 * | 9/2005 | Vishwanath | 717/174 |

* cited by examiner

*Primary Examiner* — Sheree Brown
(74) *Attorney, Agent, or Firm* — Campbell Stephenson LLP

(57) ABSTRACT

A method and apparatus of uniquely tagging a computer system that is provisioned using a provisioning server. The unique tag is hidden within the computer system by exploiting select characteristics of the computer system to ensure that the tag is both hidden and semi-immutable. The tag may be embedded by manipulating such characteristics as the INODE differentials, the disk sector differentials, or the directory order. The tag may encode the unique identifier for the provisioned computer, as well as other information about the provisioning server, such as serial number, version number of the software, or any other information that is pertinent to identifying or monitoring the use of the software.

21 Claims, 4 Drawing Sheets

400

500

METHOD AND APPARATUS FOR CREATING AN EMBEDDED TAG FOR A COMPUTER SYSTEM

BACKGROUND OF THE INVENTION

1. Field of the Invention

The present invention generally relates to techniques for provisioning computer systems and, more particularly, a method and apparatus for tagging provisioned computer systems.

2. Description of the Background Art

To quickly add or replace computer systems within a computer network, a provisioning server may be used to install an image file of a reference computer onto new or replaced computer systems. The image file generally contains all of the software, data and operating systems of the reference computer. In essence, the image file is a "snapshot" of the reference computer system. The provisioned computer operates in exactly the same manner as the reference computer, i.e., the provisioned computer is a clone of the reference computer. Such provisioning is common in large enterprise systems, where many computer systems are added or replaced on a regular basis. One example of a provisioning server is a server utilizing the OPFORCE™ software manufactured by Veritas Corporation of Mountain View, Calif. This software captures an image of a reference computer and replicates that image onto a new or replacement computer system. In backup systems, image files (snapshots) of computer systems are stored and then used to provision replacement computers. One such backup system is NETBACKUP® also manufactured by Veritas Corporation.

Generally, the license fee for the provisioning software may be computed based upon the number of computers that are provisioned by the software. Since each and every one of the provisioned computer systems are identical, it is very difficult to monitor the number of new computer systems that have been provisioned by the provisioning server. Generally each use of the provisioning server is "counted" as a use and results in a royalty payment. However, the provisioning server may be used to "reprovision" a computer system that has failed. Such a reprovisioning should not be counted as an additional provisioned computer system for licensing royalty purposes, but it may be incorrectly counted.

In addition, there is no mechanism for identifying which version of the provisioning server or which type of provisioning server was used to provision a computer by examining the provisioned computer. If a newly provisioned computer was not operating correctly, such information about the provisioning server would be useful in troubleshooting the provisioned computer.

Therefore, there is a need in the art for a method and apparatus for tagging the computer systems that are provisioned by a provisioning server.

SUMMARY OF THE INVENTION

The present invention is a method and apparatus of tagging a computer system that is provisioned using a provisioning server. The tag is hidden within the computer system by exploiting characteristics of the computer system to ensure that the tag is both hidden and semi-immutable. The tag may be embedded by manipulating such characteristics as the INODE differentials, the disk sector differentials, or the directory entry order. The tag may encode a unique identifier for the provisioned computer, as well as other information about the provisioning server, such as serial number, version number of the provisioning software, or any other information that is pertinent to identifying or monitoring the use of the provisioning server. The invention may include audit software for extracting the tag from computer systems that have been provisioned using the tag.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
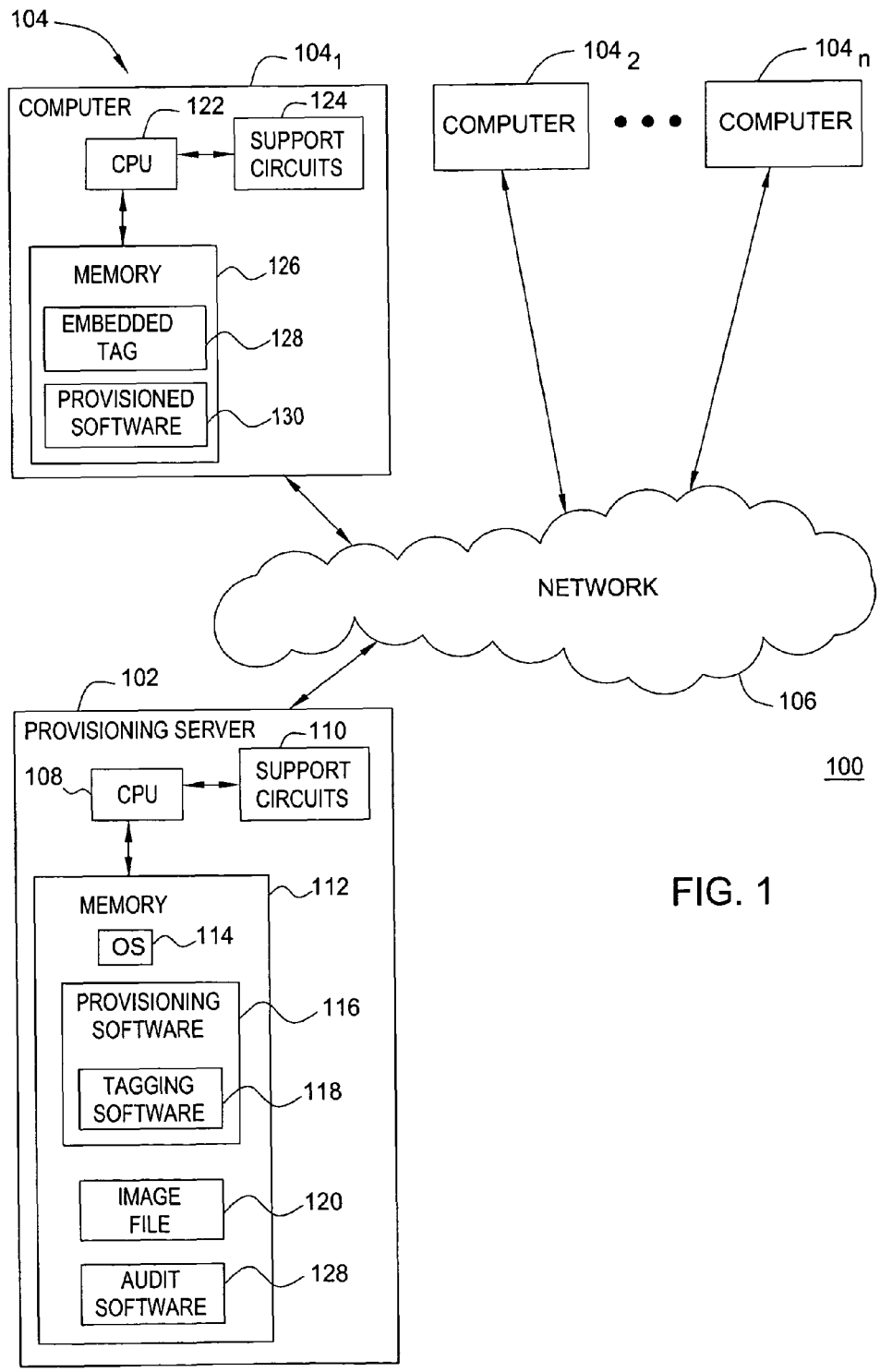
FIG. 1 depicts a block diagram of a computer network having a provisioning server for provisioning computer systems.

FIG. 1 depicts a computer network 100 comprising a provisioning server 102, a communications network 106, and computers that are to be provisioned 104$_1$, 104$_2$, 104$_3$, . . . 104$_n$ (collectively referred to as computer systems 104). The provisioning server 102 comprises a central processing unit (CPU) 108, support circuits 110, and memory 112. The CPU 108 may be one or more of any form of general purpose or specific purpose microprocessor. The support circuits 110 may be any form of support circuit used to facilitate the functionality of the CPU 108, including power supplies, clock circuits, cache, input/output circuits, and the like. The memory 112 may be any form of storage for software and data, including random access memory, read-only memory, removable storage, disk drives, optical storage, and the like, as well as any combination thereof. The memory stores the various software packages used by the provisioning server 106, including an operating system (OS) 114, the provisioning software 116, and an image file 120. The provisioning software 116 comprises the tagging software of the present invention that performs a process of placing a unique tag on a computer system as the computer is being provisioned. Optionally, the memory may contain audit software 128. The audit software 128 may also be stored in a separate computer that is used for auditing fingerprints (tags) on the computer systems 104.

The provisioning server 102 is generally connected to computer systems 104 through a communications network 106. The network 106 may be any form of communications network, e.g., Ethernet, LAN, WAN, Fiberchannel, and the like. Through the network 106, the provisioning server 102 may provision various computers 104 using the image file 120. The image file 120 may be a snapshot of a reference computer. In essence, the image file 120 is replicated by the provisioning server 102 onto the computer systems 104 to clone the reference computer. In other embodiments of the invention, the image file may be a backup copy of information on a computer system. In such an embodiment, the provisioning software is a portion of backup software used for restoration of backup information on a computer system. The provisioning process may be used to introduce and add new computers to the network, as well as replace failed computers.

The present invention creates a tag using tagging software 118 that is embedded into each computer system 104 during the provisioning process. In such a manner, the computer systems 104 are uniquely tagged with the identifier. This tag may be audited using the audit software 128 to determine certain information about the computer systems 104.

Each of the computer systems 104 comprise a CPU 122, support circuits 124 and memory 126. The CPU 122 may be one or more general purpose or specific purpose microprocessors. The support circuits are well-known circuits used to facilitate operation of the CPU 122 including clock circuitry, cache, power supplies, input/output circuits and the like. The memory 126 is any form of storage used to store software, data and other information. The memory 126 may include one or more of random access memory, read only memory, disk drives, removable memory, optical memory and the like. Once provisioned, the memory 126 comprises an embedded tag 128 and the provisioned software 130. The provisioned software 130 is extracted from the image file 120 during the provisioning process.

Figure 2:
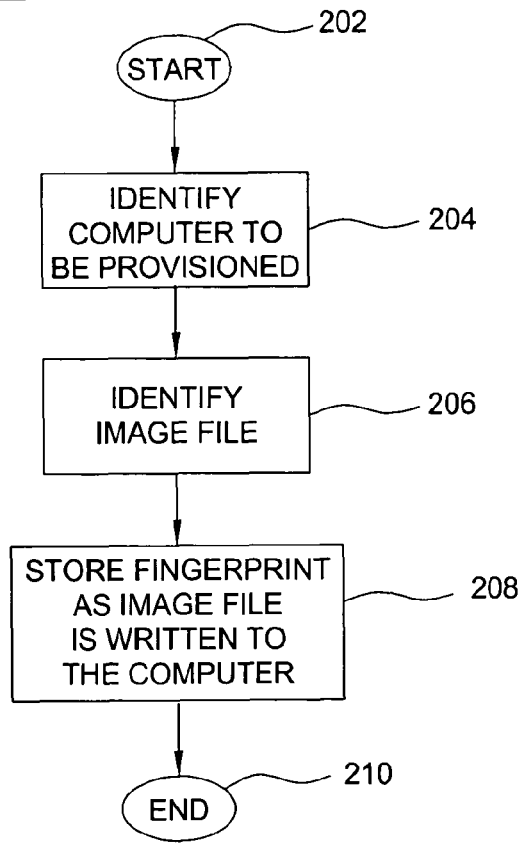
FIG. 2 depicts a flow diagram of a method of provisioning a computer system in accordance with the present invention.

FIG. 2 depicts a flow diagram of a method 200 representing the operation of tagging software 118. The method 200 begins at step 202 and proceeds to step 204. At step 204, the method 200 identifies the computer to be provisioned. At step 206, the method 200 identifies the image file that is to be used in the provisioning process to provision the selected computer. At step 208, the tag is written to the computer system as the image file is replicated onto the computer system. The method 200 ends at step 210, with the computer system containing the replicated image file (provisioned software 130) and an embedded tag 128.

Figure 3:
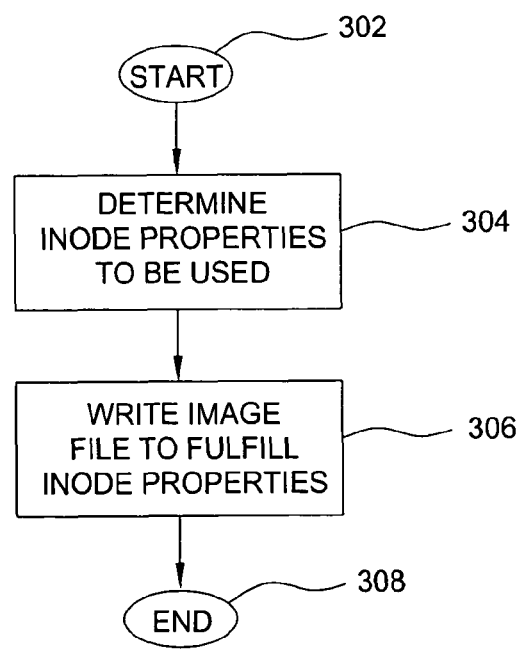
FIG. 3 depicts a flow diagram of a first technique for creating a semi-immutable fingerprint.
Figure 4:
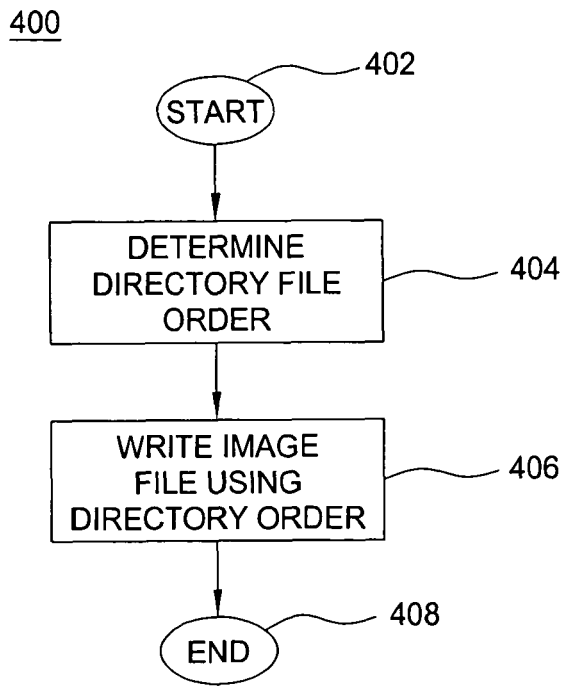
FIG. 4 depicts a flow diagram of a second technique for creating a semi-immutable fingerprint.
Figure 5:
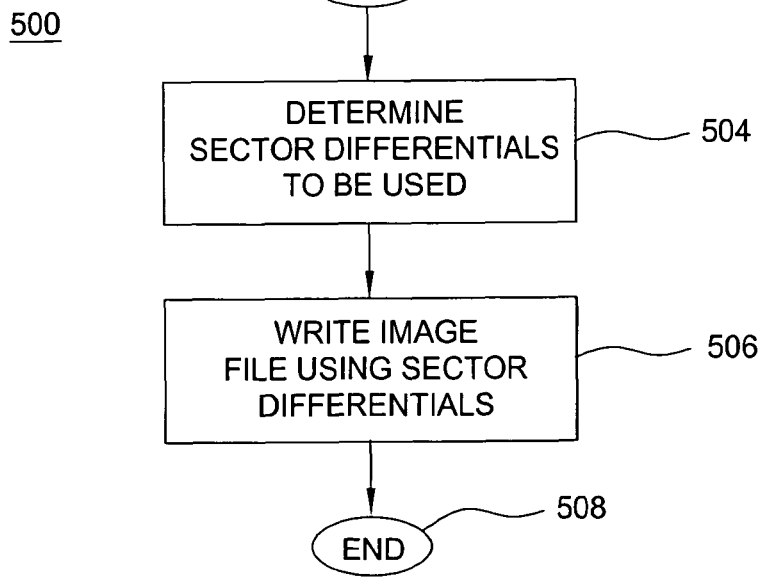
FIG. 5 depicts a flow diagram of a third technique for creating a semi-immutable fingerprint.

There are various characteristics of the computer system that can be controlled to enable a unique tag to be embedded into the computer system in a manner that is hidden from the operators or users of the computer systems. Such a tag should also be semi-immutable as well as hidden to ensure that the tag cannot be easily removed (intentionally or inadvertently) from the computer system. Although there are many characteristics of the computer system that can be manipulated during the provisioning process to uniquely identify the computer system, the disk drive storage characteristics are the most flexible and readily available characteristics for manipulation. Another portion of the computer system that can be uniquely altered during the provisioning process is the BIOS. FIGS. 3, 4 and 5 describe three examples of disk drive characteristics that can be manipulated to embed a unique tag.

FIG. 3 depicts a flow diagram of a method 300 for creating a tag in a computer system. FIG. 3 forms one embodiment of an implementation for step 208 of FIG. 2. The method 300 begins at step 302 and proceeds to step 304. At step 304, the method 300 determines an INODE property that is to be used to identify the computer system. An INODE is a data structure holding information about the files in a UNIX file system. There is an INODE for each file and a file is uniquely identified by the file system on which it resides and its INODE number on that system. Each INODE contains the following information: the device where the INODE resides, locking information, mode and type of file, the number of links to the file, the owner's user and group identification, the number of bytes in the file, access and modification times, the time the INODE itself was last modified, and the address of the file's blocks on the disc. A UNIX directory is an association between the leaf names and the INODE numbers.

One example of an INODE property that can be used to create a unique tag is an INODE differential. An INODE differential is created by a software routine that creates a specific INODE pattern when the file system is mounted on the computer system. In one embodiment, the pattern uses six standard UNIX files from the /bin directory to form the five differentials, 1, 2, 3, 4, and 5. Any files, any number of files, and any pattern of differentials can be created in a similar manner. Since the example set of files are typically never altered after the operating system is provisioned, the INODE differentials, and therefore the tag, will rarely become altered, i.e., it is semi-immutable.

A pattern of INODE differentials can be created to encode a unique identification number for the computer system being provisioned, i.e., a serial number, as well as encoding a unique identifier for the provisioning server that was used to provision the computer, as well as a unique identifier for the version of provisioning software that was used for provisioning the computer system. Other information may also be encoded. At step 306, the image file is written in such a manner to fulfill the INODE differential pattern that was generated in step 304. The process 300 ends at step 308. The unique identifier as well as the other information that was encoded is stored in a database within the provisioning server or elsewhere.

FIG. 4 depicts a flow diagram of a second technique for encoding an identifier tag while provisioning a computer system. The method 400 begins with step 402 and proceeds to step 404, where the directory file order is defined in a unique order that encodes the tag. By creating a specific file name order within the directory file, that order of file names can be used to encode information about the computer system and the provisioning server. Once the directory file name order is created, the files in the image file are written to the computer system to be provisioned, at step 406, using that unique file name order. At step 408, the method 400 ends. In this manner, the computer system identifier and other information can be embedded in a hidden, semi-immutable manner. The file name order for the low level files that are provisioned by the server is generally not altered once created. To a casual observer, the file name order would have no significance and provide a way to hide the tag. The file name order is stored in a database along with the encoded information.

FIG. 5 depicts a block diagram of method 500 that represents a third technique for encoding a tag into a computer system. The method 500 begins at step 502 and proceeds to step 504, where the sector differentials that are to be used on the disk drive of the computer system being provisioned are defined. Since the provisioning server has write access, the sector information and placement on a blank disk drive is controlled by the provisioning process at the time the machine is being set up. Furthermore, the volume manager that may be used by the computer system and provisioned onto the computer system can also be used also to set up and define sector information at the time the volume manager is launched for the first time. The spacing between sectors can be uniquely controlled to create a unique spacing for each computer system such that the sector differentials can be used to encode the tag information. At step 506, as the image file is provisioned to the computer system and the sector differentials are used to encode the tag onto the computer system. At step 508, the method 500 ends. Since the sector differentials are not altered after provisioning, the embedded tag is semi-immutable. To an observer, the sector differentials would not have an identifiable pattern. As such, the embedded tag would be hidden. The sector differentials and the embedded information for each computer system would be stored in a database.

Using at least one of the techniques of FIG. 3, 4 or 5 establishes a tag or tags within the computer system that is not a physical imprint, but rather an exploitation of characteristics of the computer system itself. Such exploitation through manipulation of these characteristics ensures that the tag or tags are well hidden within the computer system, as well as semi-immutable, because the characteristics that are selected are generally not altered during normal computer system operation. Multiple techniques may be used to embed redundant tags or to embed different tags that encode different information.

Figure 6:
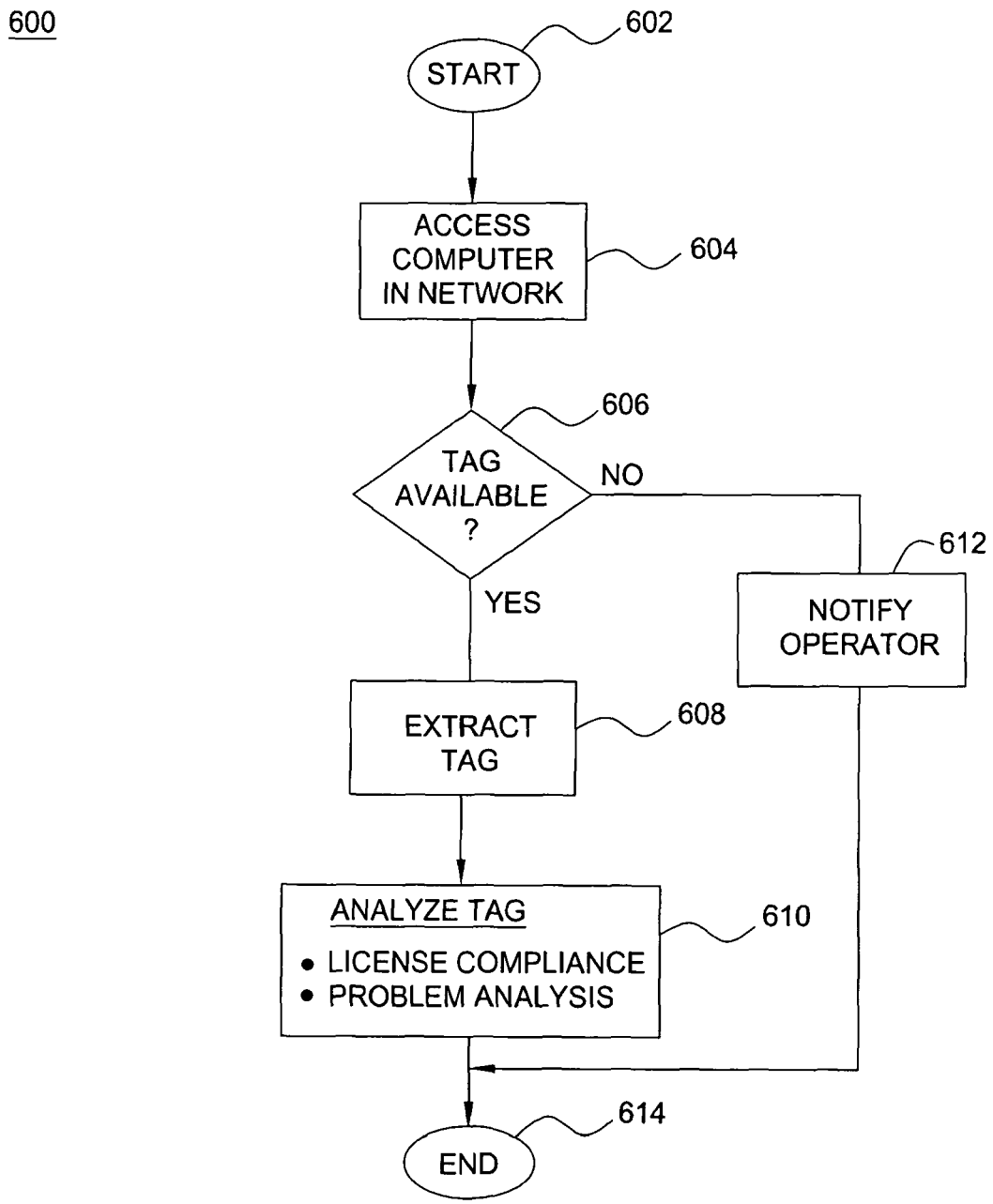
FIG. 6 depicts a flow diagram of a method of auditing a fingerprint stored in a computer system.

FIG. 6 depicts a flow diagram of a method 600 that is used for auditing the tag of a computer system via a network. The method 600 begins at step 602 and proceeds to step 604, where a specific computer within a network is accessed. At step 606, the audit software determines whether a tag is available within the computer system. If the tag is not available or is not recognized, the method 600 proceeds to step 612, where an operator is notified of the tag identification failure. If, at step 606, the tag is identified, the tag is extracted at step 608. At step 610, the tag is correlated to a database that contains information regarding the tag. The tag is used to identify the computer system through a unique serial number identification, and it may also be used to identify the provisioning server that was used to provision the computer system, as well as the software version number of the provisioning software. The tag information can be used to, for example, determine whether the computer system is within license compliance parameters or to perform asset management. Also, the analysis can be used for solving problems or errors in the provisioning process. If, for example, a computer was provisioned and the computer did not function after provisioning, the audit process can be used to identify which provisioning server was used to provision that computer system, as well as the version of software that was used to provision the computer. Such an audit process can identify problems and sources of error within the provisioning system. The method 600 ends at step 614. If multiple tags were encoded into the computer, the method 600 may be repeated to extract and analyze additional tags.

While the foregoing is directed to embodiments of the present invention, other and further embodiments of the invention may be devised without departing from the basic scope thereof, and the scope thereof is determined by the claims that follow.

The invention claimed is:

1. A method of tagging comprising:
identifying a computer system, onto which an image file will be provisioned;
creating a tag that identifies the computer system, wherein the creating comprises
generating a pattern of a storage characteristic of a storage device of the computer system, wherein
the image file comprises a plurality of files,
the storage characteristic indicates, at least in part, a storage placement of a file in a storage device,
the generating comprises
forming a differential association between a first storage placement and a second storage placement,
a first file of the plurality of files is written to the storage device at the first storage placement,
a second file of the plurality of files is written to the storage device at the second storage placement,
the differential association indicates a differential between the first storage placement and the second storage placement,
the pattern comprises a set of differential associations between respective storage placements of at least some of the plurality of files, and
the pattern encodes the tag; and
provisioning the image file onto the computer system, wherein
the provisioning configures the computer system to operate as a clone of a reference computer system,
the provisioning comprises
writing the plurality of files of the image file to the storage device according to the respective storage placements of the pattern, and
the writing the plurality of files of the image file according to the respective storage placements of the pattern results in the tag being embedded in the image file.

2. The method of claim 1, wherein the tag identifies a version of provisioning software used to provision the computer system with the image file.

3. The method of claim 1 further comprising:
identifying a stored tag embedded in the written image file by analyzing at least one storage characteristic of the storage device for the pattern;
extracting the stored tag to produce an extracted tag; and
analyzing the extracted tag to determine if the computer system is in compliance with a license.

4. The method of claim 1 further comprising:
identifying a stored tag embedded in the written image file by analyzing at least one storage characteristic of the storage device for the pattern;
extracting the stored tag to produce an extracted tag; and
analyzing the extracted tag to analyze problems in the provisioning of the computer system.

5. A method of auditing comprising:
identifying a tag embedded in an image file written to a storage device of a computer system, wherein
the computer system is configured to operate as a clone of a reference computer system,
the image file comprises a plurality of files, and
the identifying the tag further comprises
analyzing the plurality of files for a pattern of a storage characteristic of the storage device, wherein
the storage characteristic indicates, at least in part, a storage placement of a file in the storage device, the analyzing comprises
recognizing a differential association between a first storage placement and a second storage placement,
a first file of the plurality of files is written to the storage device at the first storage placement,
a second file of the plurality of files is written to the storage device at the second storage placement,
the differential association indicates a differential between the first storage placement and the second storage, placement,
the pattern comprises a set of differential associations between respective storage placements of at least some of the plurality of files,
the pattern encodes the tag, and
the plurality of files of the image file written to the storage device according to the respective storage placements of the pattern results in the tag being embedded in the image file;
extracting the tag from the pattern; and
analyzing the tag to determine information regarding the computer system, wherein the information comprises an identifier of the computer system.

6. The method of claim 5 wherein the information further comprises at least one of license compliance information, provisioning server software version identification, and provisioning error information.

7. The method of claim 5 wherein a plurality of tags are extracted.

8. An apparatus for tagging comprising:
means for identifying a computer system, onto which an image file will be provisioned;
means for creating a tag that identifies the computer system, wherein
the means for creating the tag comprises
means for generating a pattern of a storage characteristic of a storage device of the computer system, wherein
the image file comprises a plurality of files,
the storage characteristic indicates, at least in part, a storage placement of a file in the storage device,
the means for generating comprises
means for forming a differential association between a first storage placement and a second storage placement,
a first file of the plurality of files is written to the storage device at the first storage placement,
a second file of the plurality of files is written to the storage device at the second storage placement,
the differential association indicates a differential between the first storage placement and the second storage placement,
the pattern comprises a set of differential associations between respective storage placements of at least some of the plurality of files, and
the pattern encodes the tag; and
means for provisioning the image file onto the computer system, wherein
the computer system is provisioned to operate as a clone of a reference computer system,
the means for provisioning comprises
means for writing the plurality of files of the image file to the storage device according to the respective storage placements of the pattern, and
the plurality of files of the image file written to the storage device according to the respective storage placements of the pattern results in the tag being embedded in the image file.

9. The apparatus of claim 8, wherein the tag identifies a version of provisioning software used to provision the computer system with the image file.

10. The apparatus of claim 8 further comprising:
means for identifying a stored tag embedded in the image file written to the storage device of the computer system, wherein the means for identifying comprises means for analyzing at least one storage characteristic of the storage device for the pattern;
means for extracting the stored tag to produce an extracted tag; and
means for analyzing the extracted tag to determine if the computer system is in compliance with a license.

11. The apparatus of claim 8 further comprising:
means for identifying a stored tag embedded in the image file written to the storage device of the computer system, wherein the means for identifying comprises means for analyzing at least one storage characteristic of the storage device for the pattern;
means for extracting the stored tag to produce an extracted tag; and
means for analyzing the extracted tag to analyze problems in the provisioning of the computer system.

12. The method of claim 1, wherein the tag uniquely identifies the computer system.

13. The method of claim 1, wherein the tag identifies a provisioning server that provides the image file.

14. The method of claim 1, wherein the tag is stored in a hidden and semi-immutable manner.

15. The method of claim 1, wherein
the pattern is an INODE differential pattern,
the plurality of files comprise a plurality of INODEs,
the tag is embedded in the image file by writing the plurality of INODEs of the image file to the storage device according to the INODE differential pattern, and
the INODE differential pattern provides that the plurality of INODEs are spaced on the storage device by one or more INODE differentials.

16. The method of claim 1, wherein
the pattern is a sector differential pattern, and
the sector differential pattern provides that the storage device is divided into a plurality of sectors that are spaced by one or more sector differentials, and
the tag is embedded in the image file by writing the plurality of files of the image file to the plurality of sectors on the storage device.

17. The method of claim 1, wherein
the pattern is a directory file order, and
the tag is embedded in the image file by writing the plurality of files of the image file to the storage device according to the directory file order.

18. The method of claim 1, wherein multiple storage characteristics are used to encode a plurality of tags representing a plurality of information about the computer system.

19. The method of claim 1, wherein
the tag identifies information about the computer system, and the tag and the information are stored in a database.

20. The method of claim 5, wherein the analyzing the tag comprises correlating the tag to a database that contains information about the computer system.

21. The method of claim 1, wherein
the image file comprises an image of the reference computer system, and
the plurality of files comprises a copy of application software, data, and operating systems of the reference computer system.

* * * * *